(12) United States Patent
Armour et al.

(10) Patent No.: US 8,713,152 B2
(45) Date of Patent: Apr. 29, 2014

(54) MANAGING DISTRIBUTED APPLICATIONS USING STRUCTURAL DIAGRAMS

(75) Inventors: David J. Armour, Bellevue, WA (US); John David Welch, Bellevue, WA (US); Richard O. Rundle, Kirkland, WA (US); Andrei Zenkovitch, Sammamish, WA (US); Ravi Kiran Chintalapudi, Bothell, WA (US); Olof L. E. Mases, Sunnyvale, CA (US)

(73) Assignee: Microsoft Corporation, Redmond, WA (US)

(*) Notice: Subject to any disclaimer, the term of this patent is extended or adjusted under 35 U.S.C. 154(b) by 54 days.

(21) Appl. No.: 13/410,496

(22) Filed: Mar. 2, 2012

(65) Prior Publication Data
US 2013/0232185 A1 Sep. 5, 2013

(51) Int. Cl.
*G06F 15/16* (2006.01)

(52) U.S. Cl.
USPC .......................................... 709/223; 709/203

(58) Field of Classification Search
None
See application file for complete search history.

(56) References Cited

U.S. PATENT DOCUMENTS

| | | | |
|---|---|---|---|
| 5,881,268 A * | 3/1999 | McDonald et al. | 703/21 |
| 6,029,258 A * | 2/2000 | Ahmad | 714/46 |
| 6,282,535 B1 | 8/2001 | Pham et al. | |
| 6,493,323 B1 | 12/2002 | Dobrowolski et al. | |
| 6,907,395 B1 | 6/2005 | Hunt et al. | |
| 7,035,930 B2 | 4/2006 | Graupner et al. | |
| 7,231,436 B1 | 6/2007 | Dalfo et al. | |
| 7,441,021 B1 | 10/2008 | Perry | |
| 7,774,446 B2 * | 8/2010 | Nedelcu et al. | 709/223 |
| 7,844,908 B2 | 11/2010 | Kodosky et al. | |
| 8,055,738 B2 | 11/2011 | Shah et al. | |
| 2002/0124245 A1 | 9/2002 | Maddux et al. | |
| 2003/0055919 A1 | 3/2003 | Fong et al. | |
| 2004/0078373 A1 | 4/2004 | Ghoneimy et al. | |
| 2004/0153869 A1 | 8/2004 | Marinelli et al. | |
| 2004/0225952 A1 | 11/2004 | Brown et al. | |
| 2005/0027846 A1 | 2/2005 | Wolfe et al. | |
| 2005/0049906 A1 | 3/2005 | Leymann et al. | |
| 2005/0096959 A1 | 5/2005 | Kumar et al. | |
| 2005/0149908 A1 | 7/2005 | Klianev | |
| 2006/0248522 A1 | 11/2006 | Lakshminarayanan | |

(Continued)

OTHER PUBLICATIONS

J. Albrecht, R. Braud, D. Dao, N. Topilski, C. Tuttle, A. C. Snoeren, and A. Vandat. Remote Control: Distributed Application Configuration, Management, and Visualization with Plush. In USENIX Large Installation System Administration Conference (LISA), Nov. 2007.*

(Continued)

*Primary Examiner* — Jung Kim
*Assistant Examiner* — Janusz Kusyk
(74) *Attorney, Agent, or Firm* — Jim Sfekas; Alin Corie; Micky Minhas

(57) ABSTRACT

Embodiments are directed to providing a structural diagram to collect user input data in a non-linear manner and to managing multiple distributed application models using a structural diagram. In one scenario, a computer system receives a user input specifying a distributed software application that is to be managed across various different computer systems. The computer system determines, based the specified distributed application, which nodes are to be displayed in a structural diagram, where the nodes of the structural diagram represent application properties for managing the specified distributed software application. The computer system then provides a structural diagram that displays the determined nodes. The nodes allow non-linear configuration of the specified application across the various computer systems.

20 Claims, 4 Drawing Sheets

(56) References Cited

U.S. PATENT DOCUMENTS

| | | | |
|---|---|---|---|
| 2006/0250578 A1* | 11/2006 | Pohl et al. | 351/210 |
| 2008/0040455 A1 | 2/2008 | MacLeod et al. | |
| 2008/0120121 A1 | 5/2008 | Gilbert et al. | |
| 2008/0201454 A1 | 8/2008 | Soffer | |
| 2012/0203823 A1* | 8/2012 | Manglik et al. | 709/203 |

OTHER PUBLICATIONS

McCartney, et al., "Application Development and Management in the Programmers' Playground", Published on: Jun., 1998, Available at: http://citeseerx.ist.psu.edu/viewdoc/download?doi=10.1.1.29.5058&rep=rep1&type=pdf.

"Configuring Workflow", Retrieved on: Dec. 27, 2011, Available at: http://confluence.atlassian.com/display/JIRA/Configuring+Workflow.

Mitchell, Scott, "Creating Dynamic Data Entry User Interfaces", Published on: Dec. 2004, Available at: http://msdn.microsoft.com/en-us/library/aa479330.aspx.

Hnetynka et al. "Component Model for Unified Deployment of Distributed Component-based Software" 2004, Charles University, 13 pages.

Lestideau, et al. "Towards Automated Software Component Confirguration and Deployment" 2002, Domaine University, 2 pages.

Perez, "A Component-Based Software Infrastructure for Grid Computing"; html://www.ercim.org/publication/Ercim_News/enw59/Perez.html, Available at least as early as May 2006, 6 pages.

U.S. Appl. No. 11/463,217, mail date Jul. 1, 2009, Office Action.
U.S. Appl. No. 11/463,217, mail date Jan. 11, 2010, Office Action.
U.S. Appl. No. 11/463,217, mail date Mar. 30, 2010, Office Action.
U.S. Appl. No. 11/463,217, mail date Aug. 16, 2010, Office Action.
U.S. Appl. No. 11/463,217, mail date Dec. 6, 2011, Office Action.
U.S. Appl. No. 11/463,217, May 10, 2012, Office Action.

* cited by examiner

MANAGING DISTRIBUTED APPLICATIONS USING STRUCTURAL DIAGRAMS

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications are designed for distribution and implementation on multiple different computer systems. Such software applications are referred to as distributed applications. These applications may be configured such that different portions or tiers of the application are capable of being run on different computer systems. As such, these application portions may be assigned for execution on different computer systems. Administering and managing each portion of the application may involve multiple different configuration windows and settings wizards for configuring each portion of the application.

BRIEF SUMMARY

Embodiments described herein are directed to providing a structural diagram to collect user input data in a non-linear manner and to managing multiple distributed application models using a structural diagram. In one embodiment, a computer system receives a user input specifying a distributed software application that is to be managed across various different computer systems. The computer system determines, based the specified distributed application, which nodes are to be displayed in a structural diagram, where the nodes of the structural diagram represent application properties for managing the specified distributed software application. The computer system then provides a structural diagram that displays the determined nodes. The nodes allow non-linear configuration of the specified application across the various computer systems.

In another embodiment, a computer system manages multiple distributed application models using a structural diagram. The computer system provides a structural diagram representing at various nodes multiple different configuration settings for a distributed software application deployed across one or more computer systems. The computer system then receives an input at one of the structural diagram's nodes indicating a task that is to be performed on the distributed software application and performs the indicated task on the distributed software application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments of the invention may be realized and obtained by means of the instruments and combinations particularly pointed out in the appended claims. Features of the embodiments of the present invention will become more fully apparent from the following description and appended claims, or may be learned by the practice of the invention as set forth hereinafter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The embodiments of the invention will be described and explained with additional specificity and detail through the use of the accompanying drawings in which.

DETAILED DESCRIPTION

Figure 1:
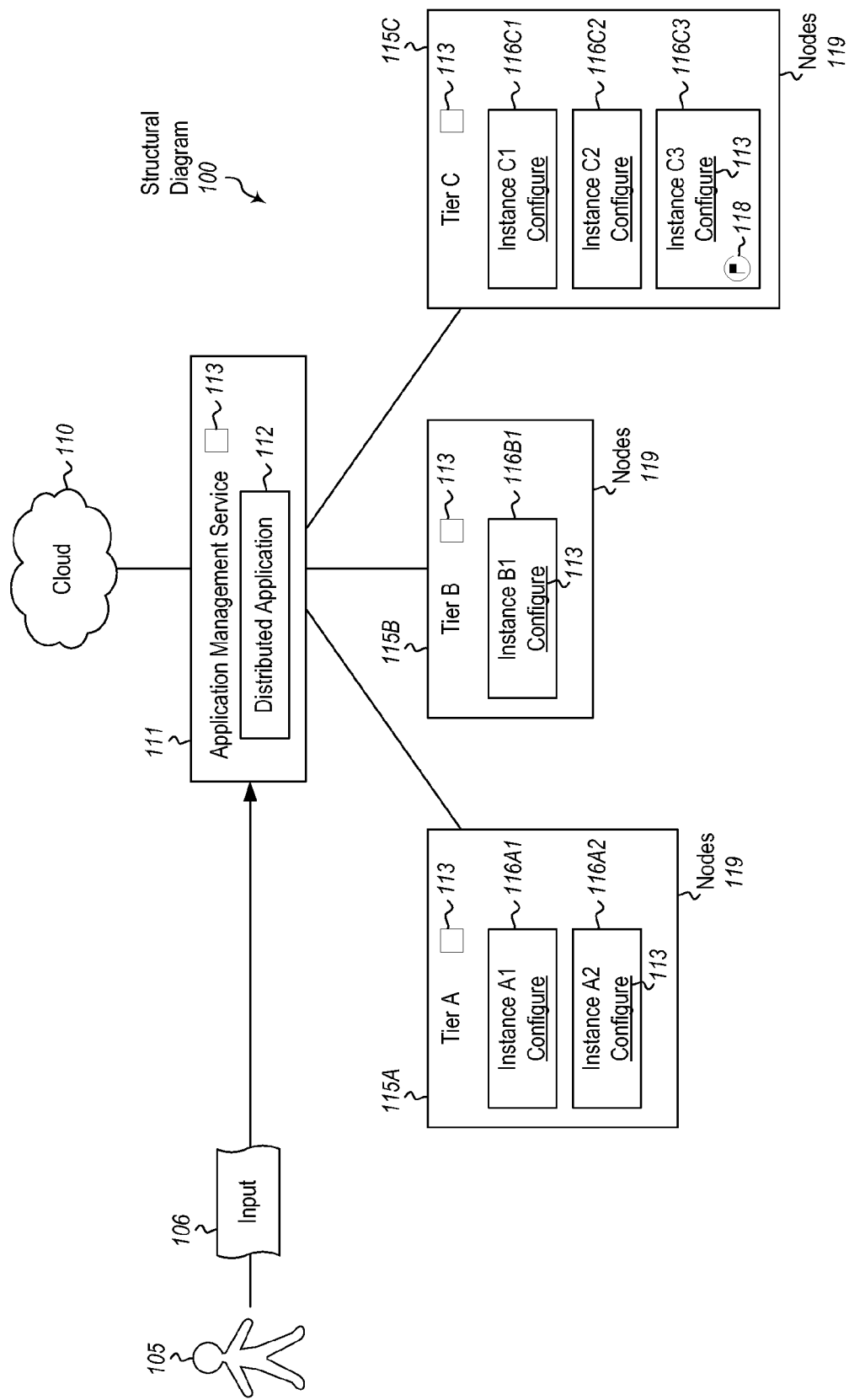
FIG. 1 illustrates a computer architecture in which embodiments of the present invention may operate including providing a structural diagram to collect user input data in a non-linear manner.

Embodiments described herein are directed to providing a structural diagram to collect user input data in a non-linear manner and to managing multiple distributed application models using a structural diagram. In one embodiment, a computer system receives a user input specifying a distributed software application that is to be managed across various different computer systems. The computer system determines, based the specified distributed application, which nodes are to be displayed in a structural diagram, where the nodes of the structural diagram represent application properties for managing the specified distributed software application. The computer system then provides a structural diagram that displays the determined nodes. The nodes allow non-linear configuration of the specified application across the various computer systems.

In another embodiment, a computer system manages multiple distributed application models using a structural diagram. The computer system provides a structural diagram representing at various nodes multiple different configuration settings for a distributed software application deployed across one or more computer systems. The computer system then receives an input at one of the structural diagram's nodes indicating a task that is to be performed on the distributed software application and performs the indicated task on the distributed software application.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/ or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

As used herein, the terms "cloud" or "cloud computing" refer to a model for enabling ubiquitous, convenient, on-demand network access to a shared pool of configurable computing resources (e.g., networks, servers, storage, applications, and/or services) that can be rapidly provisioned and released with minimal management effort or service provider interaction, as defined by the National Institute of Standards and Technology (NIST). The cloud computing model includes characteristics such as on-demand self-service, broad network access, resource pooling, rapid elasticity and measured service. The cloud computing model may be implemented in various service models including Software as a Service (SaaS), Platform as a Service (PaaS), or Infrastructure as a Service (IaaS), and may incorporate one or more deployment models including private clouds, community clouds, public clouds and hybrid clouds.

FIG. 1 illustrates a structural diagram 100 in which the principles of the present invention may be employed. Structural diagram 100 includes computer cloud 110. Cloud 110 may include substantially any number of computer systems, virtual or physical. Each computer system in the cloud may be configured to run software applications. Each computer system may run all or a portion of the software applications. Applications that can be split up and run on different systems are referred to herein as distributed applications (e.g. distributed application 112). These distributed applications can be divided into substantially any number of different portions (or "tiers" herein) and may be run on substantially any number of computer systems. In some cases, each tier may be run on a different computer system. In other cases, some computer systems may process multiple portions (or all) of the application. It will be understood that substantially any combination of applications, application portions and computer systems may be implemented by an administrator as needed.

In some embodiments, one or more of the application tiers may be managed using an application management service 111. The application management service may be run on a single computer system or on a plurality of computer systems. The service may receive inputs from administrative users (e.g. user 105) or other users that have sufficient rights to manage the service 111. The service then performs application management tasks based on the received inputs 106. In some cases, the input may select a distributed application for deployment (or upgrading or other modification). In other case, the input may select one of the modification buttons 113. The modification buttons may look like squares in the top right corner of the various nodes or application instances (as shown in FIG. 1), or may appear as web links like the "Configure" link in instance A2, or may appear as any other type of button or link which, when clicked or otherwise activated, opens up a new set of configuration options. In some embodiments, when one of buttons 113 is selected, a new node is dynamically created in the structural diagram 100. The new node displays configuration options specific to the selected node. This process will be explained below in greater detail.

In general, methods, systems and computer program products are provided which collect user input to perform a wide variety of management tasks. The user input is collected using a structural diagram of a particular distributed application. This diagram provides information about where the application has been deployed and the current operating state of each application portion. The structural diagram directs users on how to input application management information. The user can enter this information in whichever order the user feels comfortable. New tasks or nodes can be dynamically added or removed from the structural diagram based on user input 106. Visual cues (such as a flag 118) may guide the user 105 to the various inputs that are needed to provision or otherwise manage the distributed application 112. Once the inputs have been provided, the application management system can execute the task(s) indicated by the user's input.

Examples of tasks that can be performed using the structural diagram include: application deployment, upgrade, configure, scale in/out, copy, and monitor. It will be understood that these are merely a few examples among many of application tasks that can be provided and performed by the structural diagram. It should also be noted that the management experience provided by the structural diagram can be laid on top of different existing or forthcoming application models. For instance, structural diagrams may be applied to multiple types of application definitions. For example, if one application producer defines an application one way, and another application producer defines an application another way, the structural diagram can be applied on top of both applications, regardless of definition type. The diagram thus presents the user with the same experience of deploying and configuring the application, whichever definition type is used. The structural diagram thus abstracts the underlying application definition to provide a single user experience to the end user. These concepts will be explained further below with regard to methods 200 and 300 of FIGS. 2 and 3, respectively.

Figure 2:
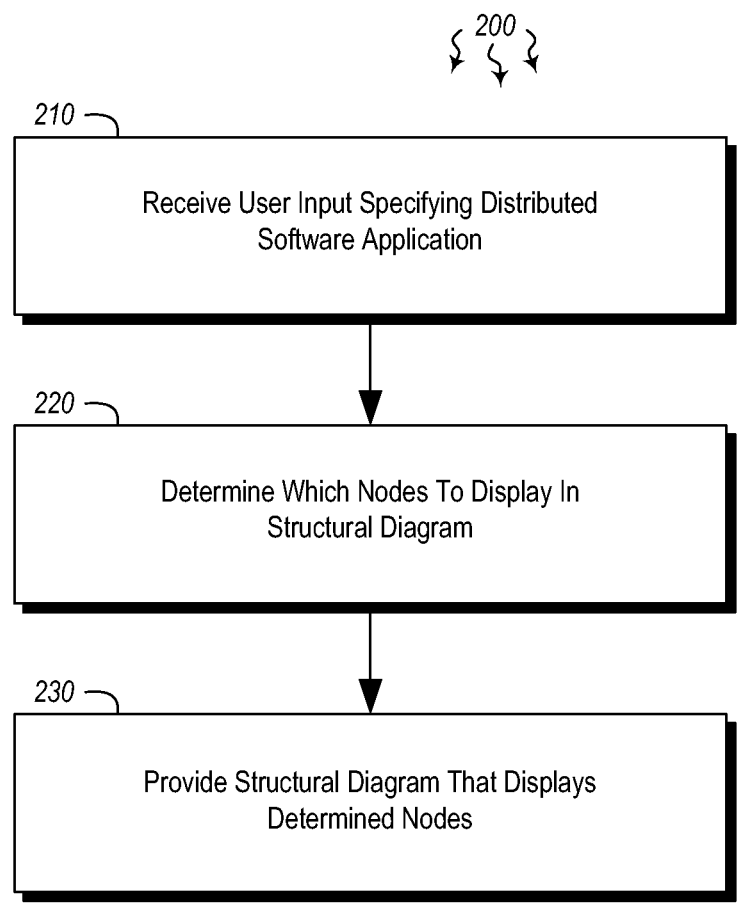
FIG. 2 illustrates a flowchart of an example method for providing a structural diagram to collect user input data in a non-linear manner.
Figure 3:
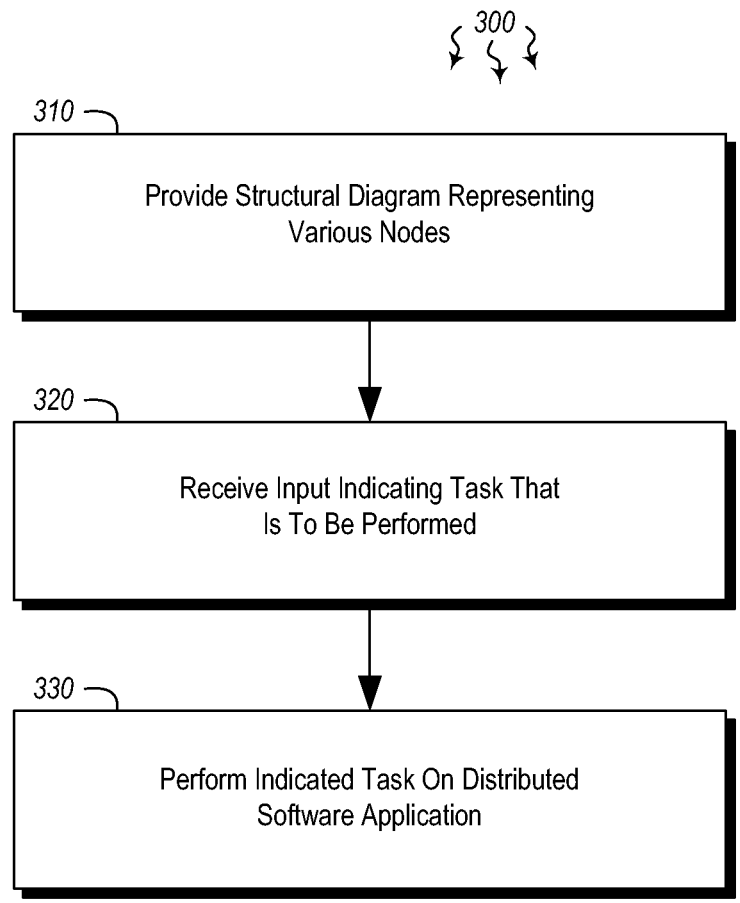
FIG. 3 illustrates a flowchart of an example method for managing multiple distributed application models using a structural diagram.

In view of the systems and architectures described above, methodologies that may be implemented in accordance with the disclosed subject matter will be better appreciated with reference to the flow charts of FIGS. 2 and 3. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing a structural diagram to collect user input data in a non-linear manner. The method 200 will now be described with frequent reference to the components and data of structural diagram 100.

Method 200 includes an act of receiving a user input specifying a distributed software application that is to be managed across one or more computer systems (act 210). For example, application management service 111 may receive user input 106 from user 105. The input may indicate that distributed application 112 is to be managed across various computer systems including nodes 115A (tier A), 115B (tier B) and 115C (tier C). Although distributed application 112 is divided into three tiers in this example, the application may be divided into substantially any number of tiers. Each tier may represent a different type of functionality. For instance, tier A may represent web functionality, tier B may represent data storage and tier C may represent application policies. These are only examples of the many different ways an application may be divided.

Each tier may include one or more instances. These instances may be physical computer systems (including different processors, processor cores, processor threads, etc.) or virtual computer systems (e.g. virtual servers, virtual databases, etc.). Each instance may be individually managed by the user 105. Accordingly, using the structural diagram, the user may manage at the instance level, at the tier level or at the application management service level. The user may manage any of these levels, without necessarily having configured the other levels. In this manner, the structural diagram 100 allows a user to provide configuration data and other inputs in a non-linear manner. By clicking on a configuration button or link 113, a variety of configuration options specific to that service, tier or instance are presented to the user. The user may then select from these options to manage the implementation of the distributed application as desired.

Continuing with method 200, the method includes an act of determining, based the specified distributed application, which of a plurality of different nodes is to be displayed in the structural diagram 100, where the nodes of the structural diagram represent application properties for managing the specified distributed software application (act 220). Thus, if user 105 selects distributed application 112, for example, nodes 119 are displayed representing tiers A-C (115A-115C). In FIG. 1, each of the nodes represents a tier of an application. However, in different embodiments, additional nodes or different nodes may be displayed to represent different items including other computing networks (in some cases only those networks that are available to host the distributed application 112), other physical or virtual computing systems (e.g. private or public clouds) or other items that may be useful in allowing the user to manage the distributed application.

Management of the distributed application may include many different things including application deployment, application upgrading and application reconfiguration. The configuration buttons 113 allow different configuration settings to be changed. Thus, if a user clicks on a "Configure" button (e.g. in instance B1 (116B1)), the user will be presented with configuration options specific to that tier B instance. Similarly, if a user clicked on the "Configure" button for instances A1 (116A1), A2 (116A2), C1 (116C1), C2 (116C2) or C3 (116C3), the user would be presented with configuration options specific to that instance. The configuration options may be presented in a new node that is dynamically generated upon the user's selection. After the configuration options are set, the node may be automatically removed from the structural diagram.

Figure 4B:
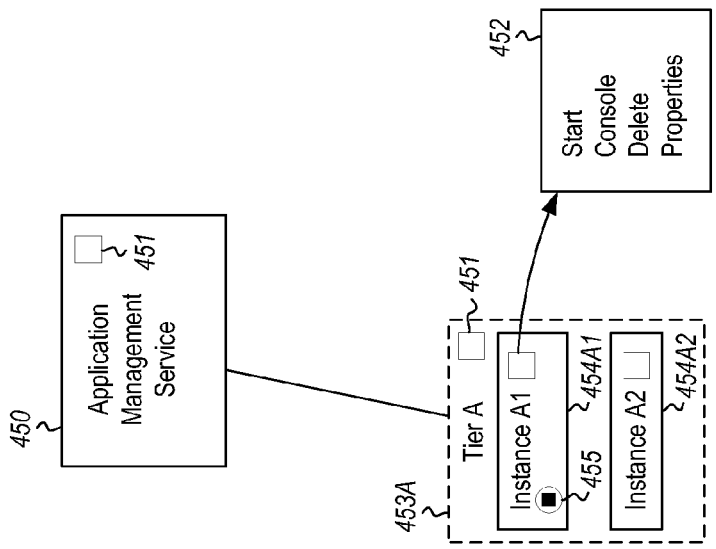
FIGS. 4A and 4B illustrate embodiments in which distributed application tiers are managed using a structural diagram.

As shown in FIG. 1, instance C3 (116C3), a visual cue may be provided that guides structural diagram users (e.g. 105) in selecting appropriate configuration settings. The visual cue may simply be a flag (as in FIG. 1) indicating that one or more configurations needs to be attended to by the user. The visual cue may also be more specific. As shown in FIG. 4B, visual cue 455 may show a "Stop" icon indicating that that particular instance (454A1) is currently stopped. Thus, the visual cue may show the current operational state or health of the instance, tier or application management service. Many different visual cues are possible, and substantially any number of visual cues may be displayed simultaneously.

The visual cues may be in the form of visual overlays, that are displayed over a particular node. Or, the visual cues may be pop-up alerts that may take up a small or large portion of the user's screen. The user may be able to click on or otherwise select a visual cue to view more information about the cue and, at least in some cases, may be taken to a screen where the user can resolve any issues represented by the visual cue. In this manner, when issues arise related to deployment or some other aspect of managing the application, the user can resolve those issues directly in the structural diagram. By clicking on or otherwise selecting the visual cue, the user can resolve those issues that are pertinent to the level of the visual cue (e.g. whether on the instance level, the tier level or the service level). In this manner, the administrative user can manage the application over the lifecycle of the application. Moreover, the user can configure level-specific options and resolve level-specific issues directly using the configuration options dynamically provided by the structural diagram.

Method 200 also includes an act of providing a structural diagram that displays the determined nodes, the nodes allowing non-linear configuration of the specified application across the one or more computer systems (act 230). As explained above, structural diagram 100 may be provided for use by an administrative user 105. The structural diagram may show different nodes related to a distributed application. These nodes may be expanded, changed or removed based on inputs from the user. The structural diagram may highlight those settings that are to be configured by the user. Thus, a user may look at the structural diagram and see that instances A1 (116A1) and C2 (116C2) are highlighted. The user would then know that instances A1 and C2 have settings that need to be configured or have issues that need to be resolved. Accordingly, the user may be able to determine at a glance which services, tiers or instances need attention. Using the visual cues, the user may also be able to see the current operational status of each service, tier and instance.

The structural diagram 100 may also provide a health status. The health status may be for the application management service, for any one or more of the application tiers or for any one or more of the application instances. The health status may be provided next to or as an overlay for any of the structural diagram elements. In cases where the health is not at an optimal level (e.g. insufficient processing or networking resources are available, or execution of the application is otherwise stopped), the structural diagram may provide an indication of how to fix those health problems that are presented in the health status. Accordingly, the structural diagram may indicate that instance B1 (116B1) is currently stopped. In a health status indication next to or overlaid on the instance's node (or provided in a health status window), various options may be provided to reconfigure and/or restart the instance. Other options may be provided depending on the health status. In this manner, a variable, dynamically generated list of options for dealing with a poor health status may be provided to the user in the structural diagram.

Similarly, if the user were to select, for example, a setting in an instance, tier or service that was highlighted by the structural diagram, a filtered set of sub-settings may be provided for the selected setting. At least in some embodiments, the filtered settings include only those that are pertinent to that instance, tier or service. As nodes are selected by the user, options displayed in neighboring nodes may also be filtered based on which node was selected and/or which configuration settings were chosen. When a user provides input selecting various settings or configuring various policies, those inputs are enacted substantially immediately on the appropriate instance, tier or service. In this manner, the application management service may be used to manage the operation of distributed applications in real time. The user may choose to configure highlighted nodes first, or may decide to configure other nodes first. The user is free to configure settings in whatever order the user chooses. The user is not confined to a linear or wizard-based approach to application configuration.

FIG. 3 illustrates a flowchart of a method 300 for managing multiple distributed application models using a structural diagram. The method 300 will now be described with frequent reference to the components and elements of structural diagram 100 and the elements of FIGS. 4A and 4B.

Method 300 includes an act of providing a structural diagram representing at one or more nodes a plurality of different configuration settings for a distributed software application deployed across a plurality of computer systems (act 310). For example, structural diagram 100 may be provided in a user interface that allows the user 105 to interact with the diagram. The user interface may be any type of touchscreen or traditional mouse-and-keyboard interface. The structural diagram includes nodes 119 that represent different distributed application tiers and tier instances. Configuration settings may be accessed for any of the instances, tiers or even the application management service 111. These settings may be accessed using one of the configuration buttons 113 or links.

Figure 4A:
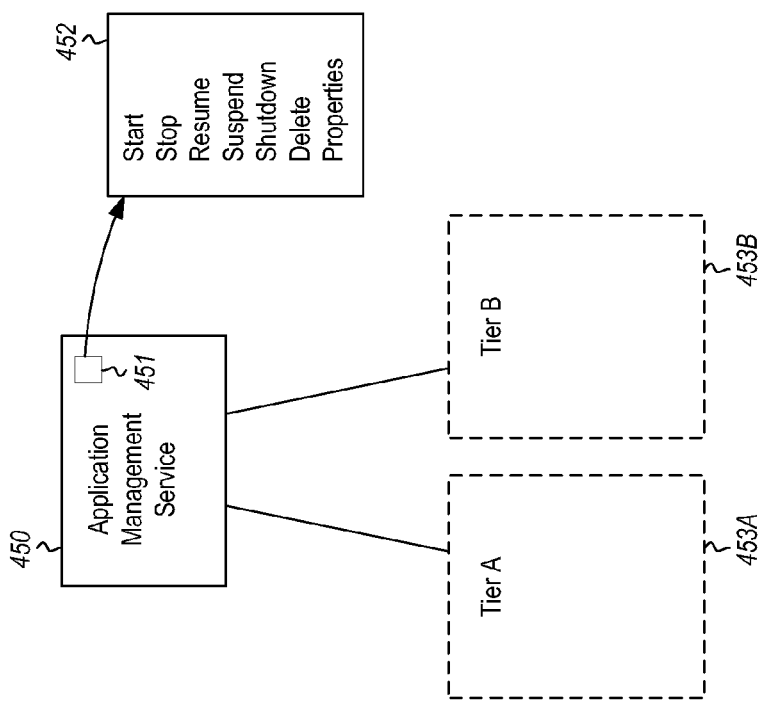

Method 300 also includes an act of receiving an input at one of the structural diagram's nodes indicating a task that is to be performed on at least one portion of the distributed software application (act 320). For example, as shown in FIG. 4A, a user input may click on or otherwise select configuration button 451 of application management service 450. The application management service 450 may allow management of one or more application tiers including tiers A (453A) and B (453B). Once the configuration button has been selected, the structural diagram may dynamically generate a new node or window that shows configuration settings or tasks that may be performed. The available settings and/or tasks may be a filtered list that only includes tasks and settings that are applicable to that management service, tier or instance.

Method 300 further includes an act of performing the indicated task on the at least one portion of the distributed software application (act 330). Thus, when a user selects a task from the available tasks, the task is performed on the corresponding instance, tier or service. For instance, if user 105 were to select the stop command in window 452, the application management service 450 would stop. Similarly, if the user selected the resume command, the application management service would resume. In some cases, the resume command (or other inapplicable commands) may not be presented or may be grayed out while the service is running. For example, as shown in FIG. 4B, because the instance is stopped (as indicated by visual cue 455), the stop command is not shown in window 452. Thus, when a user selects the configuration settings button 451 on an instance (e.g. on instance A1 (454A1) or A2 (454A2) on tier A (453A), the stop command is not available. The tasks may include creating, upgrading, deleting or otherwise changing an instance, tier or service. Many other settings and tasks are possible, and those shown in FIGS. 4A and 4B are merely examples.

Thus, the structural diagram 100 allows an administrative user to view the current status of each node involved in or associated with a distributed application. The structural diagram provides a visual state representation of the current state at each node in the diagram, and allows the user to edit properties of each instance, tier or service directly in the diagram. These property changes or tasks may be performed in any order by the user. Moreover, these property changes and tasks may be performed regardless of which type of cloud the application tiers are hosted on, whether the cloud includes public or private clouds, and whether the cloud includes physical and/or virtual computer system.

Accordingly, methods, systems and computer program products are provided which provide a structural diagram to collect and apply user input data in a non-linear manner. Moreover, methods, systems and computer program products are provided which allow an administrative user to manage multiple distributed application models using a structural diagram.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system including at least one processor and a memory, a computer-implemented method for providing a structural diagram to collect user input data for managing a distributed software application in a non-linear manner, the method comprising:
   an act of receiving a user input specifying the distributed software application, which is to be managed across a plurality of computer systems, the distributed software application comprising a plurality of tiers that execute across the plurality of computer systems, each tier representing a different type of functionality of the distributed software application;
   an act of determining, based on the specified distributed software application, which of a plurality of different nodes are to be displayed in the structural diagram, the plurality of nodes of the structural diagram representing application properties for managing the specified distributed software application and including at least: (i) a first node representing an application management service of the distributed software application, (ii) a second node representing at least one of the plurality of tiers of the distributed software application, and (iii) a third node representing at least one computer system instance, the third node being a sub-node of the second node; and
   an act of providing the structural diagram, which displays the determined nodes, each of the displayed nodes providing one or more graphical user interface controls for providing user input for managing the corresponding represented application property, thereby allowing non-linear configuration of the distributed software application across the plurality of computer systems and at an application management service level, at a tier level, and at an instance level.

2. The method of claim 1, wherein management of the distributed application includes at least one of application deployment, application upgrading and application reconfiguration.

3. The method of claim 1, wherein the structural diagram provides one or more visual cues that guide structural diagram users in selecting appropriate configuration settings.

4. The method of claim 1, wherein the structural diagram highlights one or more settings that are to be configured by the user.

5. The method of claim 4, wherein upon selection of at least one of the highlighted one or more settings, a filtered set of sub-settings is provided for the selected at least one setting.

6. The method of claim 1, wherein the structural diagram displays one or more notification flags identifying pending application management issues.

7. The method of claim 1, wherein upon selection of a particular node, one or more options displayed in one or more neighboring nodes are filtered based on which node was selected.

8. The method of claim 1, wherein the structural diagram allows management of the distributed application over the lifecycle of the application.

9. The method of claim 1, wherein one or more of the nodes represents a cloud computing system.

10. The method of claim 1, wherein one or more of the nodes represents a communication network that is available to host the specified distributed software application.

11. The method of claim 1, further comprising:
   an act of receiving user input at a specified node; and
   an act of configuring distributed application settings for the specified node.

12. The method of claim 1, wherein the structural diagram provides a health status for one or more cloud computing systems at one or more of the nodes.

13. The method of claim 12, wherein the structural diagram further provides an indication of how to fix one or more health problems that are presented in the health status.

14. The method of claim 1, wherein the computer system comprises a virtual computer system.

15. A computer program product comprising one or more physical storage devices having stored thereon computer-executable instructions that, when executed by one or more processors of a computer system, cause the computer system to implement a method for managing a distributed application using a structural diagram, the method comprising:
   an act of receiving a user input specifying the distributed application, which is to be managed across a plurality of computer systems, the distributed application comprising a plurality of tiers that execute across the plurality of computer systems, each tier representing a different type of functionality of the distributed application;
   an act of determining, based on the specified distributed application, which of a plurality of different nodes are to be displayed in the structural diagram, the plurality of nodes of the structural diagram representing application properties for managing the distributed application and including at least: (i) a first node representing an application management service of the distributed application, (ii) a second node representing at least one of the plurality of tiers of the distributed application, and (iii) a third node representing at least one computer system instance, the third node being a sub-node of the second node;
   an act of providing the structural diagram, which displays the determined nodes, each of the displayed nodes providing one or more graphical user interface controls for providing user input for managing the corresponding represented application property, thereby allowing non-linear configuration of the distributed software application across the plurality of computer systems and at an application management service level, at a tier level, and at an instance level;
   an act of receiving an input at one of the structural diagram's nodes indicating a task that is to be performed on at least one portion of the distributed application; and
   an act of performing the indicated task on the at least one portion of the distributed application.

16. The computer program product of claim 15, further comprising:
   an act of receiving an input selecting at least one of the structural diagram nodes; and an act of the structural diagram presenting one or more tasks that are available for the selected node.

17. The computer program product of claim 16, wherein the structural diagram presents one or more configuration options that are specific to the selected node.

18. The computer program product of claim 15, wherein the structural diagram provides a visual state representation of the current state at each node in the diagram.

19. The computer program product of claim 15, wherein the indicated task is performed, regardless of a type of cloud the distributed application is hosted on.

20. A computer system comprising the following:
one or more processors;
system memory;
one or more computer-readable storage media having stored thereon computer-executable instructions that, when executed by the one or more processors, causes the computing system to perform a method for providing a structural diagram to collect user input data for managing a distributed software application in a non-linear manner, the method comprising the following:
receiving a user input specifying the distributed software application, which is to be managed across a plurality of computer systems, the distributed software application comprising a plurality of tiers that execute across the plurality of computer systems, each tier representing a different type of functionality of the distributed software application;
determining, based on the specified distributed software application, which of a plurality of different nodes are to be displayed in the structural diagram, the plurality of nodes of the structural diagram representing application properties for managing the specified distributed software application and including at least: (i) a first node representing an application management service of the distributed software application, (ii) a second node representing at least one of the plurality of tiers of the distributed software application, and (iii) a third node representing at least one computer system instance, the third node being a sub-node of the second node; and
providing the structural diagram, which displays the determined nodes, each of the displayed nodes providing one or more graphical user interface controls for providing user input for managing the corresponding represented application property, thereby allowing non-linear configuration of the distributed software application across the plurality of computer systems and at an application management service level, at a tier level, and at an instance level.

* * * * *